March 14, 1967 C. F. LOTHROP 3,309,625
CIRCUIT FOR GENERATING A LINEAR SWEEP WHOSE PERIOD
IS ADJUSTABLE OVER A WIDE RANGE
Filed July 22, 1965
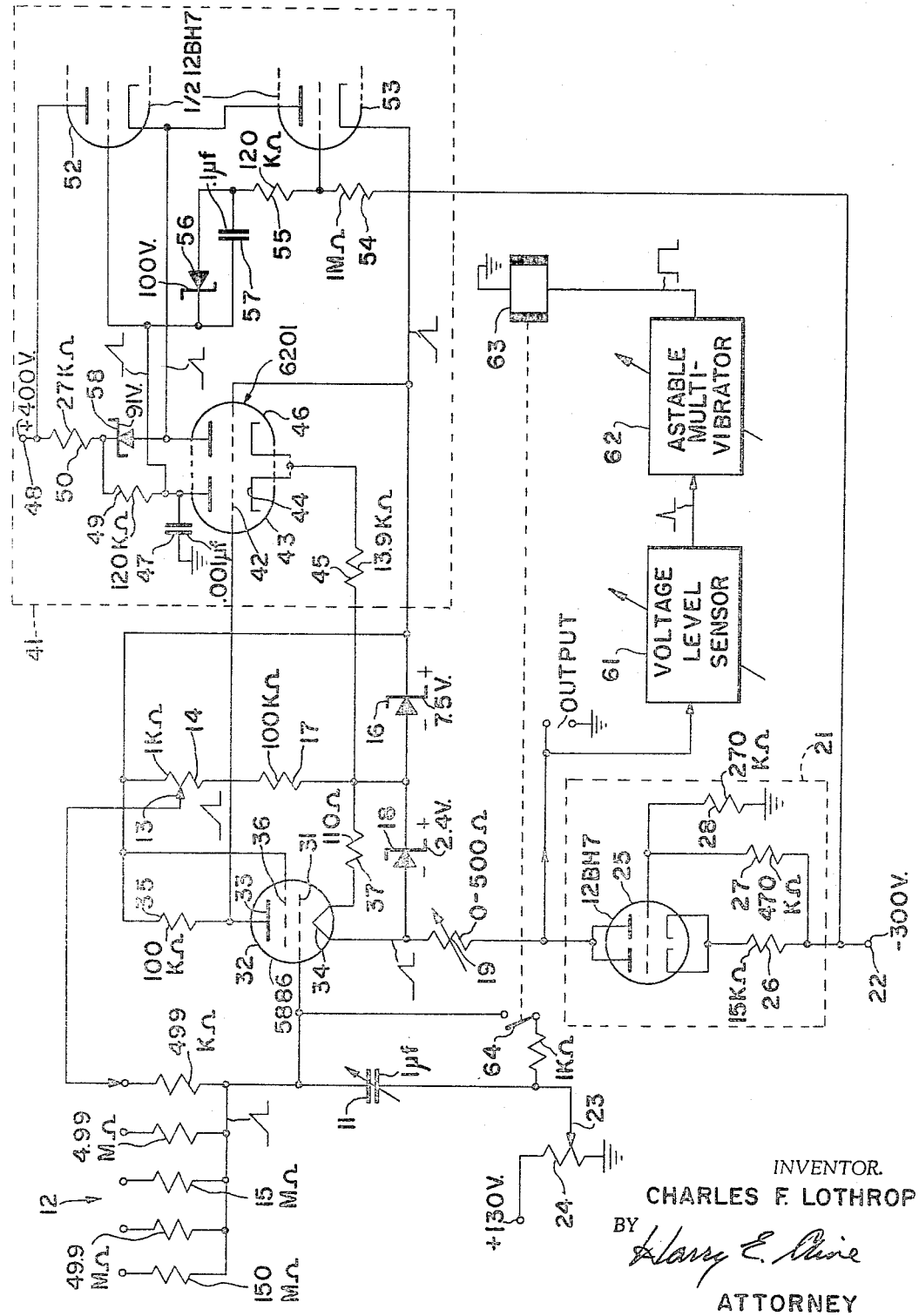
INVENTOR.
CHARLES F. LOTHROP
BY
*Harry E. Rine*
ATTORNEY United States Patent Office 3,309,625
Patented Mar. 14, 1967

3,309,625
CIRCUIT FOR GENERATING A LINEAR SWEEP WHOSE PERIOD IS ADJUSTABLE OVER A WIDE RANGE
Charles F. Lothrop, Sunnyvale, Calif., assignor to Varian Associates, Palo Alto, Calif., a corporation of California
Filed July 22, 1965, Ser. No. 474,010
7 Claims. (Cl. 331—152)

The present invention relates generally to sweep circuits and more particularly to a linear sweep circuit wherein the current through a charging capacitor is maintained constant by deriving a signal indicative of the capacitor voltage with a three terminal translating device having an input impedance of approximately $10^{14}$ ohms.

In certain applications, e.g., quadrupole residual gas analyzers, it is necessary to provide sweep circuits for deriving voltages that vary linearly as a function of time over one hundred volt ranges and having periods ranging from fifty milliseconds to fifteen hundred seconds. While many sweep circuits have been developed, I am unaware of any having each of the characteristics set forth.

According to the present invention, a sweep circuit having the prescribed parameters is provided by charging a capacitor with a constant current source wherein the voltage across a resistor in series with the capacitor is maintained constant. The linearly increasing capacitor voltage is coupled to the grid of an electrometer tube, which, because of its very high input impedance (approximately $10^{14}$ ohms), draws virtually no grid current from the capacitor and therefore assists in assuring the linear capacitor voltage buildup.

The electrometer tube anode cathode path is established with a constant voltage D.C. source comprising a Zener diode circuit. The linearly increasing voltage at the cathode of the electrometer tube is coupled through the constant voltage D.C. source to the resistor in series with the capacitor which is charged. Since the electrometer tube cathode follows the capacitor voltage by a substantially fixed amount and the voltage of the D.C. source for energizing the plate circuit of the electrometer tube is constant, the voltage across the resistance in series with the charging capacitor remains constant as the capacitor voltage increases. Since the voltage across the resistance remains constant, the current therein and through the capacitor remains constant.

Any tendency of the resistance and capacitance current to change is completely obviated with a feedback circuit that is responsive to the voltage at the electrometer tube anode or plate. The output of the feedback circuit follows the input voltage thereof, on a one-to-one basis, and is applied to the resistance in phase with the cathode voltage of the electrometer tube. The feedback circuit output voltage is also applied to the cathode of the electrometer tube through the Zener diode circuit that biases the electrometer tube anode cathode path; hence, the feedback circuit further aids in establishing the desired linear output variation derived. In addition, any tendency of the Zener diode circuit to be biased out of its low impedance, constant voltage region is circumvented by coupling the feedback network output through the Zener diode network to the electrometer tube cathode.

Since during the charging interval $$V_c = \frac{\int i_c \, dt}{C} \quad (1)$$

where $V_c$ equals the capacitor voltage at any time during the charging interval $i_c$ equals the instantaneous current through the capacitor during the charging interval
$C$ equals the value of the charging capacitor, in farads, and
$i_c$ is constant, equal to I $$V_c = \frac{It}{C} \quad (2)$$

Because the resistance, having value R, is in series with the charging capacitor, the voltage across the resistance is a constant $V_R = IR$ \quad (3)

Therefore $$V_c = \frac{V_R t}{RC} \quad (4)$$

By varying the value of the resistance, capacitance or voltage of the constant D.C. supply, which must remain equal to $V_R$, it becomes obvious from Equation 4 that the slope of the sawtooth or linear sweep voltage derived is easily changed.

To provide typical examples of the period of the sawtooth voltages that can be derived with the present invention, consider two situations wherein a 100 volt sweep excursion occurs and $V_R$ is selected to equal 10 volts. In the first example R equals 150 megohms and C equals 1 microfarad. From Equation 4, $$t = \frac{150 \times 10^6 \times 10^{-6} \times 10^2}{10} = 1500 \text{ secs.} = 25 \text{ mins.} \quad (5)$$

while in the second example R equals one-half megohm and C equals 0.01 microfarad whereby from Equation 4

$$t = \frac{0.5 \times 10^6 \times 10^{-6} \times 10^{-2} \times 10^2}{10} = 0.05 \text{ sec.} = 50 \text{ ms.} \quad (6)$$

In addition to the extreme linearity and wide range of sweep rates attained, the sweep circuit of the present invention is provided with means for adjusting the initial and maximum voltages of the saw-tooth voltage generated. Automatic recycling is also provided by short circuiting the capacitor for a predetermined time when the maximum capacitor voltage is reached. When the predetermined time has been completed, the capacitor short circuit is removed, enabling the recharging cycle to be initiated again.

It is, accordingly, an object of the present invention to provide a new and improved linear sweep circuit.

Another object of the present invention is to provide an electronic linear sweep circuit capable of deriving 100 volt saw-tooth waves having periods ranging from the millisecond range to approximately the one-half hour range or longer.

An additional object of the invention is to provide an electronic sweep circuit including a very high input impedance translating device, which device is responsive to the voltage of a charging capacitor and derives a signal to maintain the capacitor current constant.

A further object of the invention is to provide a new and improved linear sweep circuit wherein the slope of the output voltage, as well as the maximum and minimum values thereof, are readily adjusted.

The above and still further objects, features and advantages of the present invention will become apparent upon consideration of the following detailed description of one specific embodiment thereof, especially when taken in conjunction with the accompanying drawing, wherein:

The single figure is a combined block and circuit diagram of a preferred embodiment of the invention.

Reference is now made specifically to the single figure of the drawing wherein variable capacitor 11 is charged selectively through one of the five resistors comprising variable resistance 12. The values of capacitor 11 and the resistors in resistance 12 are selected to provide RC products or time constants ranging from approximately 5 milliseconds to 150 seconds. To achieve this wide diversity in the time constants, capacitance 11 may have either a 1 microfarad or 0.01 microfarad value while the value of resistance 12 is any one of 499K ohms, 4.99 megohms, 15 megohms, 49.9 megohms and 150 megohms.

The series circuit comprising capacitor 11 and resistance 12 is supplied with a constant current from tap 13 of potentiometer 14 comprising variable D.C. source 15. Zener diode 16 establishes a fixed 7.5 volt D.C. bias across the series combination of potentiometer 14 and resistance 17. The junction between the anode of diode 16 and resistance 17, at the negative terminal of supply 15, is connected through another Zener diode 18 which establishes a 2.4 volt D.C. bias. The charging path for capacitor 11 is continued from the anode or Zener diode 18 through variable resistance 19 and current source 21 to the minus 300 volt D.C. biasing potential at terminal 22. Capacitor 11 is returned to ground through slider 23 of potentiometer 24 that is connected across a D.C. potential of plus 130 volts to establish initial voltages for input grid 31 of electrometer tube 32.

In the preferred embodiment, current source 21 comprises two parallel sections of a 12–BH7 dual triode 25 that provides a combined dynamic plate impedance of approximately 2600 ohms. The cathode of triode 25 is connected through resistance 26 to terminal 22, while the tube grid is biased by the voltage divider comprising resistors 27 and 28, which voltage divider is connected between terminal 22 and ground. The anode of tube 25 is connected to resistance 19 and serves as a high dynamic impedance current source for the linear sweep voltage derived from the circuit of the present invention.

The voltage between the junction of capacitor 11 with resistance 12 and ground, i.e., the voltage across capacitor 11 plus the voltage at point 23 is coupled to control grid 31 of tetrode 32, that is for example a type 5886. Anode 33 and cathode 34 of tetrode 32 are biased by the series combination of Zener diodes 16 and 18 and load resistance 35 in the tetrode plate circuit so that a total voltage of less than 10 volts exists between the anode and the cathode. Screen grid 36 is connected directly to the cathode of Zener diode 16 to bias the grid slightly above the potential of plate 33. Heating current for directly heated cathode 34 is established by Zener diode 18 and current limiting resistance 37. By biasing tetrode 32 in the manner indicated, the tetrode serves as an electrometer tube having an input impedance between control grid 31 and cathode 34 of approximately $10^{14}$ ohms; the grid current has been measured as being less than $2 \times 10^{-15}$ amperes. In contrast, the charging current flowing through resistance 12 is approximately $6.67 \times 10^{-10}$ amperes, a value more than $3 \times 10^5$ times the grid current of electrometer tube 32. Hence, it can be assumed that an open circuit exists between the grid and cathode of electrometer tube 32 and that all of the current supplied to resistance 12 is fed through capacitor 11 and none is shunted through the electrometer tube.

By maintaining the currents through capacitor 11 and resistance 12 exactly equal, the problem of providing a linear saw-tooth output voltage reduces to establishing a constant current through the resistance or a constant voltage across it. According to the present invention, the voltage across resistance 12 is maintained constant at a level equal to the voltage between cathode 34 of tube 32 and slider 13. The voltage at slider 13 relative to cathode 34 is precisely regulated by Zener diodes 16 and 18.

To maintain Zener diodes 16 and 18 biased into their low impedance, back biased state, where they can be considered as constant voltage sources and provide a fixed D.C. potential from cathode 34 to slider 13, feedback circuit 41 is provided. The input of feedback circuit 41, to the high impedance grid 42 of triode 43, is across plate load resistance 35 of electrometer tube 32 and the fixed D.C. voltage of Zener diode 16. Cathode 44 of tube 43 is connected through resistance 45 that self-biases tube 43, as well as triode 46. The anode of tube 43 is connected across filter capacitor 47 and to plus 400 volt D.C. terminal 48 through series resistances 49 and 50. The time constant of the circuit including capacitor 47 is so small compared to the slope of the linear saw-tooth voltage derived at grid 42 that a faithful replica of the grid voltage is derived at the anode of triode 46.

The voltage at the anode of tube 43 is D.C. coupled in parallel to the grids of triodes 52 and 53. Triodes 52 and 53 are connected together so that the cathode of the former is connected directly to the anode of the latter. Suitable grid bias for series connected tubes 52 and 53 is established by connecting the negative D.C. voltage at terminal 22 through resistors 54 and 55, as well as 100 volt Zener diode 56, that is connected across smoothing capacitor 57. The anode of tube 52 is connected to the plus 400 volt D.C. source at terminal 48 while the cathode of tube 53 is directly connected to the high voltage side of supply 15, at the cathode of Zener diode 16, and to the grid of tube 46. The D.C. voltage at the anode of tube 46 is responsive to the voltage at the junction between the cathode and anode of triodes 52 and 53. This voltage will follow the grid voltage of triode 52. 91 volt Zener diode 58 serves to cause the interaction of resistors 49 and 50 to follow the cathode of triode 52 with a constant D.C. difference.

The voltage deriving from feedback circuit 41, at the cathode of triode 53, is at a relatively low impedance level. It follows exactly, on a one-to-one basis, the voltage variations at the grid of electrometer tube 32. Hence, when the potential at grid 31 of electrometer tube 32 has increased 10 volts from its original value, the voltage deriving from circuit 41 has also increased by 10 volts. The increased voltage at the cathode of tube 53 is bootstrapped back to resistance 12 via a D.C. path through D.C. supply 15 to maintain the voltage across and current through the resistance constant. It is also possible to analyze the bootstrapping action as taking place from the cathode of electrometer tube 32 through the D.C. path comprising Zener diode 18 and the parallel combination of Zener diode 16 with resistance 17 to tap 13 of potentiometer 14.

To provide a system for automatically terminating the sweep when a predetermined voltage level is attained and reinitiating the sweep, the anode of tube 25 is connected to the cascaded combination of variable level voltage sensor 61, variable period astable multivibrator 62 and relay coil 63. When the output voltage of the system, at the anode of tube 25, reaches the desired level set into variable voltage level sensor 61, the sensor derives an output signal that is coupled to the input network of astable multivibrator 62. The input pulse to multivibrator 62 causes the multivibrator to change state for a predetermined time interval, set according to the period of the sweep. At the end of the interval, multivibrator 62 returns to its quiescent state until another pulse is supplied to it by sensor 61. During the period when multivibrator 62 is activated in response to the pulse from sensor 61, energizing potential is supplied by it to relay coil 63. In response to the energizing potential fed to coil 63, contacts 64 are closed to provide a discharge path for capacitor 11 through the low impedance of current limiting resistance 64. The minimum activating period of multivibrator 62 is selected so that all of the charge has leaked off of capacitor 11 by the time relay 63 is deenergized and contacts 64 are closed.

In utilizing the sweep circuit of the present invention, an operator initially selects minimum and maximum sweep voltages desired by adjusting potentiometer 23 and level sensor 61. The sweep period is then selected by adjusting the values of capacitor 11 and resistance 12 in accordance with Equation 4. If the period is not precisely fixed at the desired value, a vernier adjustment is made by changing the voltage of source 15 by varying the position of slider 13. Vernier adjustment for the initial output voltage is provided by setting the value of resistance 19 so an initial D.C. voltage of exactly the desired value is derived at the anode of tube 25.

To consider the manner in which the linear sweep voltage is derived, consider an example wherein the starting and final potentials are 0 and plus 100 volts, respectively. Therefore, slider 23 is grounded as are both electrodes of capacitor 11 initially. Under the initial conditions stated, the cathode of tube 32 is biased at approximately minus 2.5 volts by the voltage drop between D.C. power supply terminals 22 and 48 through tubes 25, 52 and 53, as well as resistance 19. To compensate for the voltage drop from the grid to the cathode of electrometer tube 32 and provide a 0 D.C. output at the anode of triode 25, the value of resistance 19 (having a maximum value of 500 ohms) is appropriately adjusted.

During the charging interval for capacitor 11, current is derived from the source 21, fed through the D.C. path comprising Zener diode 18 and D.C. source 15 to the series combination of resistance 12 and capacitance 11. In response to the current flow into capacitor 11, the voltage across the capacitor increases positively from its initial 0 value. The increasing positive voltage across capacitor 11 is reflected as a very highly attenuated negative going potential at the anode of electrometer tube 32.

The negative going voltage across load resistor 35 is coupled to grid 42 of triode 43 where it is compared with the voltage at the cathode of tube 53, as coupled to the grid of triode 46. Comparison is by means of the common cathode error amplifier comprising triodes 43 and 46. The difference in the voltages at the grids of tubes 43 and 46 is derived as a signal at the anode of tube 43. This signal is directly coupled into the grid of cathode follower 52, and by means of Zener diode 56 and resistor 55, into the grid of cathode follower 53.

The voltage at the cathode of tube 53 will track the grid voltage of tube 53. The cathode voltage will be coupled through Zener diodes 16 and 18 to the cathode 34 of tube 32. This voltage is now in phase with the voltage at grid 31. As the gain of tube 43 is very high, the voltage at 34 will be almost exactly equal to the voltage at 31. This reduces the change in voltage at anode 33, closing the feedback path.

The positive going voltage at the cathode of tube 53 is coupled back to resistance 12 via tap 13. Since the voltage at the terminal of resistance 12 that is connected to tap 13 increases exactly with the voltage at the terminal of the resistance that is connected to capacitor 11, the voltage across and current through resistance 12 are maintained constant. All of the constant current flowing through resistance 12 is coupled to capacitor 11 since it can be considered that no current flows to the grid of electrometer tube 32. Because of the constant current flow through capacitor 11, the voltage across the capacitor electrodes increases linearly, precisely in accordance with Equation 2. In circuits actually constructed, saw-tooth waves having periods of 25 minutes and that remain linear over a 100 volt range have actually been derived with the circuit described and illustrated.

While I have described and illustrated one specific embodiment of my invention, it will be clear that variations of the details of construction which are specifically illustrated and described may be made without departing from the true spirit and scope of the invention as defined in the appended claims.

I claim:
1. A linear sweep circuit comprising a capacitor, a resistor, means for connecting said capacitor and said resistor in series with each other and a D.C. source of constant current to generate a varying voltage across said capacitor, an electrometer tube including cathode, grid and anode electrodes, said capacitor and D.C. source of constant current serially connected between said grid and cathode electrodes of said electrometer tube, one end of said resistor connected to said grid electrode of said electrometer tube, a load resistor connected to the anode of said electrometer tube, a D.C. source of constant voltage connected between said cathode electrode and said load resistor of said electrometer tube, said cathode electrode of said electrometer tube coupled to provide a voltage at the other end of said resistor having exactly the same voltage variations as the voltage variation across said capacitor, a feedback circuit coupled to said anode electrode of said electrometer tube to receive a voltage signal therefrom, said feedback circuit having gain to provide an output voltage having exactly the same variations as the voltage variation across said capacitor, said feedback circuit output voltage coupled to said cathode electrode of said electrometer tube and said other end of said resistor.

2. The linear sweep circuit according to claim 1 wherein said resistor and capacitor are adjustable.

3. The linear sweep circuit according to claim 1 wherein said feedback circuit comprises a difference amplifier including an amplifier and a cathode follower connected to a common cathode resistor, said anode of said electrometer tube D.C. coupled to a grid electrode of said amplifier, a cathode follower means including a first tube and a second tube each including an anode, cathode and grid electrodes, the anode electrode of said first tube directly connected to the cathode electrode of said second tube and an anode electrode of said cathode follower, the cathode electrode of said first tube coupled to said cathode electrode of said electrometer tube and a grid electrode of said cathode follower, the grid electrodes of said first and second tubes connected to an anode electrode of said amplifier.

4. The linear sweep circuit according to claim 1 wherein said D.C. source of constant current is a current-feedback amplifier having anode, cathode and grid electrodes, said anode electrode of said current-feedback amplifier connected to said cathode electrode of said electrometer through a common resistor, said grid and cathode electrodes of said current-feedback amplifier connected to a bias means for controlling the current output of said current feedback amplifier.

5. The linear sweep circuit according to claim 1 further comprising means for sensing the voltage level attained across said capacitor to derive a pulse of a selected duration when said voltage level across said capacitor reaches a predetermined level, and means responsive to said pulse for short circuiting said capacitor.

6. The linear sweep circuit according to claim 1 further comprising an adjustable D.C. source of voltage connected in series with said capacitor to provide an initial voltage to said capacitor.

7. The linear sweep circuit according to claim 6 further comprising a power supply for providing operating power to said linear sweep circuit, and wherein said D.C. source of constant voltage includes a potentiometer having a wiper arm connected to said resistor, a first Zener diode, and a second Zener diode, said first Zener diode and said potentiometer connected in series with said load resistor and said cathode electrode of said electrometer tube, said second Zener diode connected in parallel with said potentiometer, said Zener diodes poled to establish a constant voltage between said cathode electrode of said electrometer tube and said load resistor, said output voltage of said feedback circuit coupled to a junction defined by said load resistor and said second Zener diode.

References Cited by the Examiner
UNITED STATES PATENTS 2,983,831  5/1961  Walton _____ 328—183
3,050,686  8/1962  Korff et al. _____ 328—183

ROY LAKE, *Primary Examiner.*

J. KOMINSKI, *Assistant Examiner.*